(12) United States Patent
Daxberger et al.

(10) Patent No.: US 11,401,858 B2
(45) Date of Patent: Aug. 2, 2022

(54) EXHAUST TURBOCHARGER WITH AN EXHAUST CONTROL DEVICE, EXHAUST CONTROL DEVICE FOR AN EXHAUST TURBOCHARGER, AND METHOD FOR OPERATING AN EXHAUST TURBOCHARGER

(71) Applicant: Bayerische Motoren Werke Aktiengesellschaft, Munich (DE)

(72) Inventors: Harald Daxberger, Linz (AT); Leopold Eisterlehner, Steinbach/Steyr (AT); Andreas Kerschbaummayr, Garsten (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/821,223

(22) Filed: Mar. 17, 2020

(65) Prior Publication Data

US 2020/0217243 A1 Jul. 9, 2020

Related U.S. Application Data

(63) Continuation of application No. PCT/EP2018/072466, filed on Aug. 21, 2018.

(30) Foreign Application Priority Data

Sep. 22, 2017 (DE) ...................... 10 2017 216 777.7

(51) Int. Cl.
F02B 37/18 (2006.01)
(52) U.S. Cl.
CPC .................................. *F02B 37/186* (2013.01)
(58) Field of Classification Search
CPC .... F02B 37/186; Y02T 10/12; F02D 2250/34; F02D 41/0007; F02D 41/1448
See application file for complete search history.

(56) References Cited

U.S. PATENT DOCUMENTS 9,322,324 B2    4/2016   Landsmann
10,094,272 B2   10/2018  Groves et al.
(Continued)

FOREIGN PATENT DOCUMENTS

CN    102933818 A    2/2013
CN    103975140 A    8/2014
(Continued)

OTHER PUBLICATIONS

PCT/EP2018/072466, International Search Report dated Sep. 25, 2018 (Two (2) pages).
(Continued)

*Primary Examiner* — Audrey B. Walter
*Assistant Examiner* — Edward Bushard
(74) *Attorney, Agent, or Firm* — Crowell & Moring LLP (57) ABSTRACT

An exhaust turbocharger includes an exhaust control device provided with an exhaust flap for adjusting an exhaust gas flow flowing through a turbine stage of the exhaust turbocharger during the operation thereof, a control gear coupled to the exhaust flap, and a servomotor via which the exhaust flap can be moved in a regulated and/or controlled manner by operation of the control gear at least between a closing position, in which the exhaust flap closes an exhaust gas opening in a turbocharger housing of the turbocharger, through which exhaust gas flows during the operation of the exhaust turbocharger, and at least one other position in which the exhaust flap allows exhaust gas to flow through the exhaust gas opening. The control gear is a self-locking gear via which the exhaust flap can be prestressed in the closing position thereof in relation to the turbocharger housing.

5 Claims, 4 Drawing Sheets

(56) References Cited

U.S. PATENT DOCUMENTS

| | | |
|---|---|---|
| 2010/0322757 A1 | 12/2010 | Hall et al. |
| 2011/0126537 A1 | 6/2011 | Yoshimoto et al. |
| 2015/0252689 A1 | 9/2015 | Burmester et al. |
| 2016/0010541 A1* | 1/2016 | Wang .................... F02D 41/20 60/602 |

FOREIGN PATENT DOCUMENTS

| | | | | |
|---|---|---|---|---|
| CN | 104863698 A | 8/2015 | | |
| CN | 105317537 A | 2/2016 | | |
| CN | 105673189 A | 6/2016 | | |
| CN | 106401736 A | 2/2017 | | |
| DE | 10 2008 004 688 A1 | 7/2009 | | |
| DE | 10 2008 004 689 A1 | 7/2009 | | |
| DE | 102008004689 A1 * | 7/2009 | ............. | F02B 39/00 |
| DE | 10 2011 075 528 A1 | 12/2011 | | |
| DE | 10 2011 007 279 A1 | 10/2012 | | |
| DE | 10 2012 006 532 A1 | 10/2013 | | |
| DE | 10 2012 010 348 A1 | 11/2013 | | |
| DE | 10 2015 110 835 A1 | 1/2016 | | |
| EP | 1 522 691 A1 | 4/2005 | | |
| EP | 2245283 A1 * | 11/2010 | ............ | F02B 37/186 |

OTHER PUBLICATIONS

German Search Report issued in German counterpart application No. 10 2017 216 777.7 dated May 28, 2018, with Statement of Relevancy (Ten (10) pages).

Chinese Office Action issued in Chinese application No. 201880052260.X dated Apr. 28, 2021, with English translation (Seventeen (17) pages).

* cited by examiner

EXHAUST TURBOCHARGER WITH AN EXHAUST CONTROL DEVICE, EXHAUST CONTROL DEVICE FOR AN EXHAUST TURBOCHARGER, AND METHOD FOR OPERATING AN EXHAUST TURBOCHARGER

CROSS REFERENCE TO RELATED APPLICATIONS

This application is a continuation of PCT International Application No. PCT/EP2018/072466, filed Aug. 21, 2018, which claims priority under 35 U.S.C. § 119 from German Patent Application No. 10 2017 216 777.7, filed Sep. 22, 2017, the entire disclosures of which are herein expressly incorporated by reference.

BACKGROUND AND SUMMARY OF THE INVENTION

The invention relates to an exhaust turbocharger having an exhaust control device. Further aspects of the invention relate to an exhaust control device for an exhaust turbocharger and to a method for operating an exhaust turbocharger.

Such an exhaust control device can serve for adjusting an exhaust gas flow which flows through the turbine stage of an exhaust turbocharger during operation thereof. Adjusting the exhaust gas flow makes it possible to vary the exhaust gas charging of the turbine stage and as a result to adjust fresh air which is compressed during operation of the exhaust turbocharger by means of a compressor stage of the turbocharger that is mechanically coupled to the turbine stage.

In systems known from the prior art, a kinematic mechanism for actuating a turbine control flap normally has a direct transmission ratio. Apart from the kinematic mechanism, an actuator force required for adjusting the turbine control flap is determined, for example, by the control flap dimensioning and also gas forces prevailing during the turbocharger operation.

DE 10 2011 007 279 A1 discloses a charging device having a variable turbine or compressor geometry and an actuating device for adjusting it. The actuating device has a minimum setpoint limit and/or a maximum setpoint limit which determine/determines a minimum setpoint throughflow and/or a maximum setpoint throughflow of the variable turbine or compressor geometry. The minimum setpoint limit and/or maximum setpoint limit can be set and readjusted.

US 2010/0322757 A1 describes a turbocharger having a housing to which there are connected a plurality of movement control means by means of which an axial movement of an adjustment ring of the turbocharger can be limited. The movement control means can be inserted into respective openings integrated in the housing and project from the openings. In order to secure the movement control means on the housing, self-locking connecting parts can be provided.

It is an object of the invention to provide an exhaust turbocharger, an exhaust control device and a method of the type stated at the outset by means of which an improved adjustment of an exhaust gas flow which flows through a turbine stage of the exhaust turbocharger is made possible.

A first aspect of the invention relates to an exhaust turbocharger having an exhaust control device which comprises an exhaust flap for adjusting an exhaust gas flow which flows through a turbine stage of the exhaust turbocharger during operation thereof, and an actuating mechanism coupled to the exhaust flap, and a servomotor by means of which the exhaust flap can be moved in a regulated and/or controlled manner, through the intermediary of the actuating mechanism, at least between a closed position, in which the exhaust flap closes an exhaust gas opening in a turbocharger housing of the turbocharger, through which opening exhaust gas can flow during operation of the exhaust turbocharger, and at least one further position, in which the exhaust flap allows exhaust gas to flow through the exhaust gas opening. The expression "through the intermediary of" can here also be understood to mean "with interposition of".

According to the invention, the actuating mechanism is designed as a self-locking mechanism by means of which the exhaust flap can be prestressed in its closed position in relation to the turbocharger housing. This is advantageous since the exhaust flap can be held in the closed position by such a self-locking mechanism without the servomotor having to be supplied with a large amount of energy for this purpose. The servomotor can thus be at least intermittently deactivated in the closed position of the exhaust flap, resulting overall in a particularly energy-saving operation of the exhaust control device. This thus allows overall an improved adjustment of the exhaust gas flow which flows through the turbine stage of the exhaust turbocharger. The self-locking mechanism generally has the effect that a movement of the exhaust flap with the servomotor deactivated is not made possible or only with very high expenditure of force, for example under the action of high external forces on the exhaust flap.

The servomotor can preferably be designed as an electric motor, which can also be referred to as rotary electric actuator. This affords a number of advantages by comparison with systems known from the prior art in which vacuum boxes are used for actuating the exhaust flap. Thus, by contrast to a vacuum box, a check (diagnosis) of the adjustment when using an electric motor is possible in a particularly simple manner, whereas, in the case of vacuum boxes, a diagnosis is possible only by using an additional travel feedback. Further advantages of the electric motor over the vacuum box consist—apart from the lower weight—in being able to provide the prestressing force as a characteristic map-dependent force or a characteristic map-dependent adjustment force by the electric motor and, for example, to allow a particularly high control quality over the service life, to name but only a few examples.

In an advantageous development of the invention, the exhaust control device is designed to keep the exhaust flap prestressed in its closed position with the servomotor deactivated. This is advantageous since the exhaust gas opening can be kept particularly tightly closed by the exhaust flap without a long activation of the servomotor being required for this purpose. This contributes to an increased service life of the servomotor. The exhaust flap can be kept prestressed in the closed position by the actuating mechanism. In the deactivated state of the servomotor, the latter can exert either no or a minimum holding force in order to keep the exhaust flap prestressed by means of the actuating mechanism.

In a further advantageous development of the invention, the actuating mechanism comprises at least one worm wheel element. This is advantageous since the worm wheel element allows a particularly large force transmission ratio and thus particularly large actuating forces can be transmitted to the exhaust flap. A particularly large prestressing force can be realized by the worm wheel element in order to keep the exhaust flap closed in the closed position without having to use a particularly high-power and large servomotor for this purpose. As a result, disadvantages in terms of package, cost and power consumption associated with the size or performance of the servomotor can be avoided.

The worm element, which can also be referred to as a worm gear element, makes it possible to optimally resolve a conflict of goals between large adjustment travels, high adjustment speed and maximum prestressing force in the closed position of the exhaust flap.

In addition to the worm element, the actuating mechanism can preferably also have a linear kinematic mechanism for actuating (moving) the exhaust flap.

The worm element makes it possible in a particularly simple manner to realize a self-locking effect of the actuating mechanism. Consequently, the maximum power requirement of the servomotor can be limited to a particularly short time period.

In a further advantageous development of the invention, the actuating mechanism comprises at least one threaded spindle element. This is advantageous since the threaded spindle element allows a particularly large force transmission ratio and thus particularly large actuating forces can be transmitted to the exhaust flap. A particularly large prestressing force can be realized by the threaded spindle element in order to keep the exhaust flap closed in the closed position without a particularly high-power and large servomotor having to be used for this purpose. As a result, disadvantages in terms of package, cost and power consumption associated with the size or performance of the servomotor can be avoided.

The threaded spindle element, which can also be referred to as a spindle gear element, makes it possible to optimally resolve a conflict of goals between large adjustment travels, high adjustment speed and maximum prestressing force in the closed position of the exhaust flap.

In addition to the threaded spindle element, the actuating mechanism can preferably also have a linear kinematic mechanism for actuating (moving) the exhaust flap.

The threaded spindle element makes it possible in a particularly simple manner to realize a self-locking effect of the actuating mechanism. Consequently, the maximum power requirement of the servomotor can be limited to a particularly short time period.

A second aspect of the invention relates to an exhaust control device for an exhaust turbocharger. The exhaust control device comprises an exhaust flap for adjusting an exhaust gas flow which flows through a turbine stage of the exhaust turbocharger during operation thereof. Furthermore, the exhaust control device comprises an actuating mechanism which is coupled to the exhaust flap. In addition, the exhaust control device comprises a servomotor by means of which the exhaust flap can be moved in a regulated and/or controlled manner, through the intermediary of the actuating mechanism, at least between a closed position, in which the exhaust flap closes an exhaust gas opening in a turbocharger housing of the turbocharger, through which opening exhaust gas can flow during operation of the exhaust turbocharger, and at least one further position, in which the exhaust flap allows exhaust gas to flow through the exhaust gas opening.

According to the invention, the actuating mechanism is designed as a self-locking mechanism by means of which the exhaust flap can be prestressed in its closed position in relation to the turbocharger housing. This is advantageous since the exhaust flap can be kept in the closed position by such a self-locking mechanism without the servomotor having to be supplied with energy for this purpose. In the closed position of the exhaust flap, it is thus possible, at least intermittently, for an energy supply of the servomotor to be dispensed with without the exhaust flap thereby being moved from its closed position, resulting overall in a particularly energy-saving operation of the exhaust control device.

A third aspect of the invention relates to a method for operating an exhaust turbocharger, in which an exhaust gas flow flows through the turbine stage of the exhaust turbocharger and in which the exhaust gas flow flowing through the turbine stage is controlled by moving the exhaust flap at least between the closed position and the at least one further position. This is advantageous since an improved adjustment of the exhaust gas flow flowing through the turbine stage of the exhaust turbocharger is made possible as a result.

The statements pertaining to one of the aspects of the invention, in particular to individual features of this aspect, correspondingly also apply analogously to the other aspects of the invention, and vice versa.

In one advantageous development of the invention, the exhaust flap is at least intermittently prestressed in its closed position in relation to the turbocharger housing by driving the actuating mechanism by means of the servomotor. This is advantageous since the prestressing makes it possible to achieve particularly tight closing of the exhaust gas opening. Undesired exhaust gas leakages can be minimized as a result. In addition, the friction in the kinematic mechanism is increased and holding forces are reduced.

In a further advantageous development of the invention, the servomotor is operated in a pulsed operation at least in the closed position of the exhaust flap in order to set a prestressing force under which the exhaust flap is at least intermittently prestressed in relation to the turbocharger housing. The pulsed operation, which can generally also be referred to as pulsing, means that the prestressing force required for sealing the exhaust flap in its closed position can be ensured and reliably set. Here, the pulsed operation can result in a controlled adjustment of the prestressing force if the latter changes on account of temperature changes, for example.

The pulsing (pulsed operation) can preferably occur cyclically and/or in an event-controlled manner, that is to say, for example, upon leaving the closed position on account of a temperature change.

If the pulsing occurs cyclically and thus in fixed time intervals, a readjustment of the exhaust flap into its closed position can occur regularly. As a result, a particularly durable sealing action can be achieved by the exhaust flap in its closed position with a particularly low energy requirement.

If the pulsing occurs in an event-controlled manner, changed operating conditions of the exhaust turbocharger can be responded to in an advantageous manner. It is thus possible to respond, for example, to temperature changes and/or exhaust gas pressure changes, for example on account of a load point change of an internal combustion engine coupled to the exhaust turbocharger, in that a readjustment of the exhaust flap into its closed position occurs as a result of the event-controlled pulsing.

If the pulsing occurs in a cyclical and event-controlled manner, particularly reliable sealing can occur by means of the exhaust flap in its closed position.

In a further advantageous development of the invention, the prestressing force is set in the pulsed operation of the servomotor in dependence on an operationally related deformation of the turbocharger housing. This is advantageous since this allows the prestressing force to be set in a manner which is particularly appropriate to the requirements. Consequently, the prestressing force can be set in dependence on temperature-related length changes of the turbocharger housing.

In a further advantageous development of the invention, a force magnitude of the prestressing force is reduced during the pulsed operation of the servomotor if the force magnitude exceeds a predetermined force magnitude limit value. This is advantageous since an overloading for example of the exhaust control device can thereby be avoided in a particularly reliable manner. The force magnitude limit value can be exceeded for example in the case of a temperature-related expansion of the turbocharger housing.

Further features of the invention will emerge from the claims, the Figures and the description of the Figures. The features and combinations of features stated above in the description and also the features and combinations of features stated below in the description of the Figures and/or shown in the Figures alone can be used not only in the combination specified in each case but also in other combinations or in isolation.

The invention will now be explained in more detail on the basis of a preferred exemplary embodiment and with reference to the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
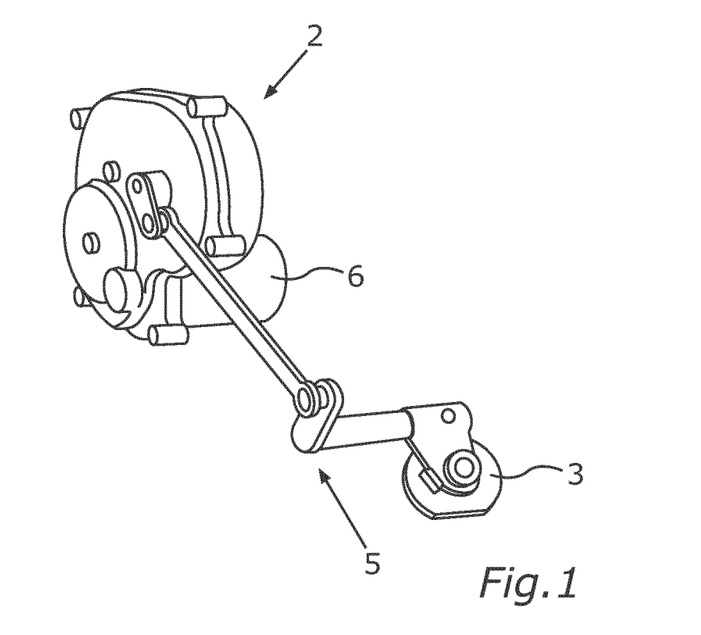
FIG. 1 shows a perspective view of an exhaust control device for an exhaust turbocharger.
Figure 2:
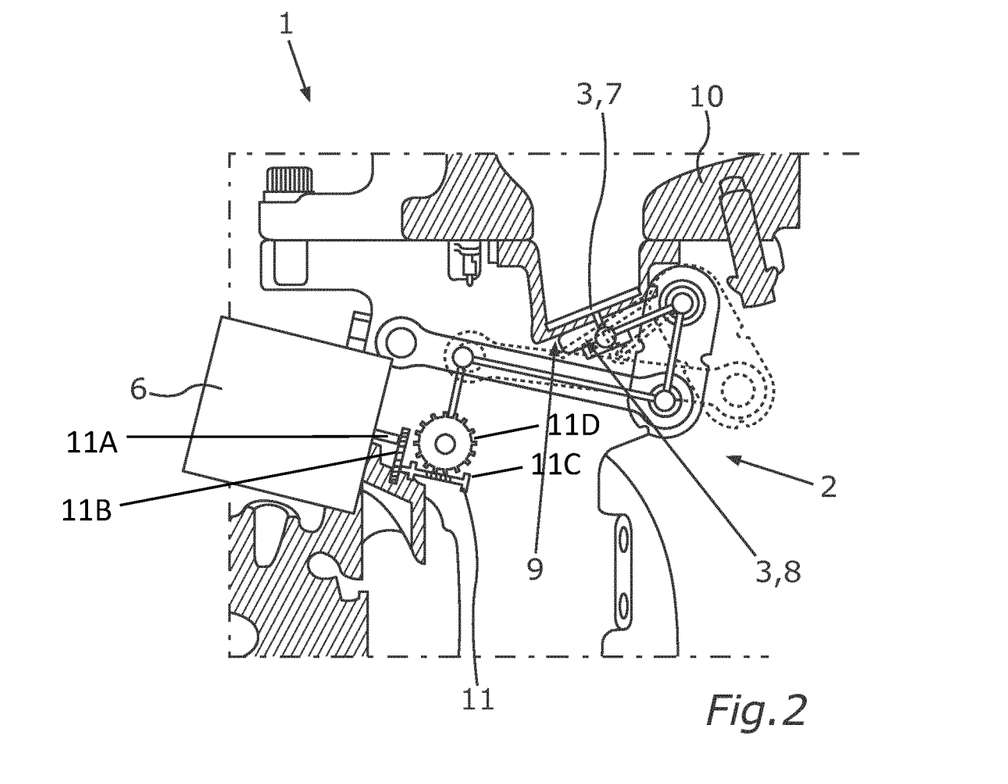
FIG. 2 shows a side view of a turbine stage of the exhaust turbocharger, wherein an exhaust flap of the exhaust control device is pressed, in a closed position, with a prestressing force onto an exhaust gas opening.
Figure 3:
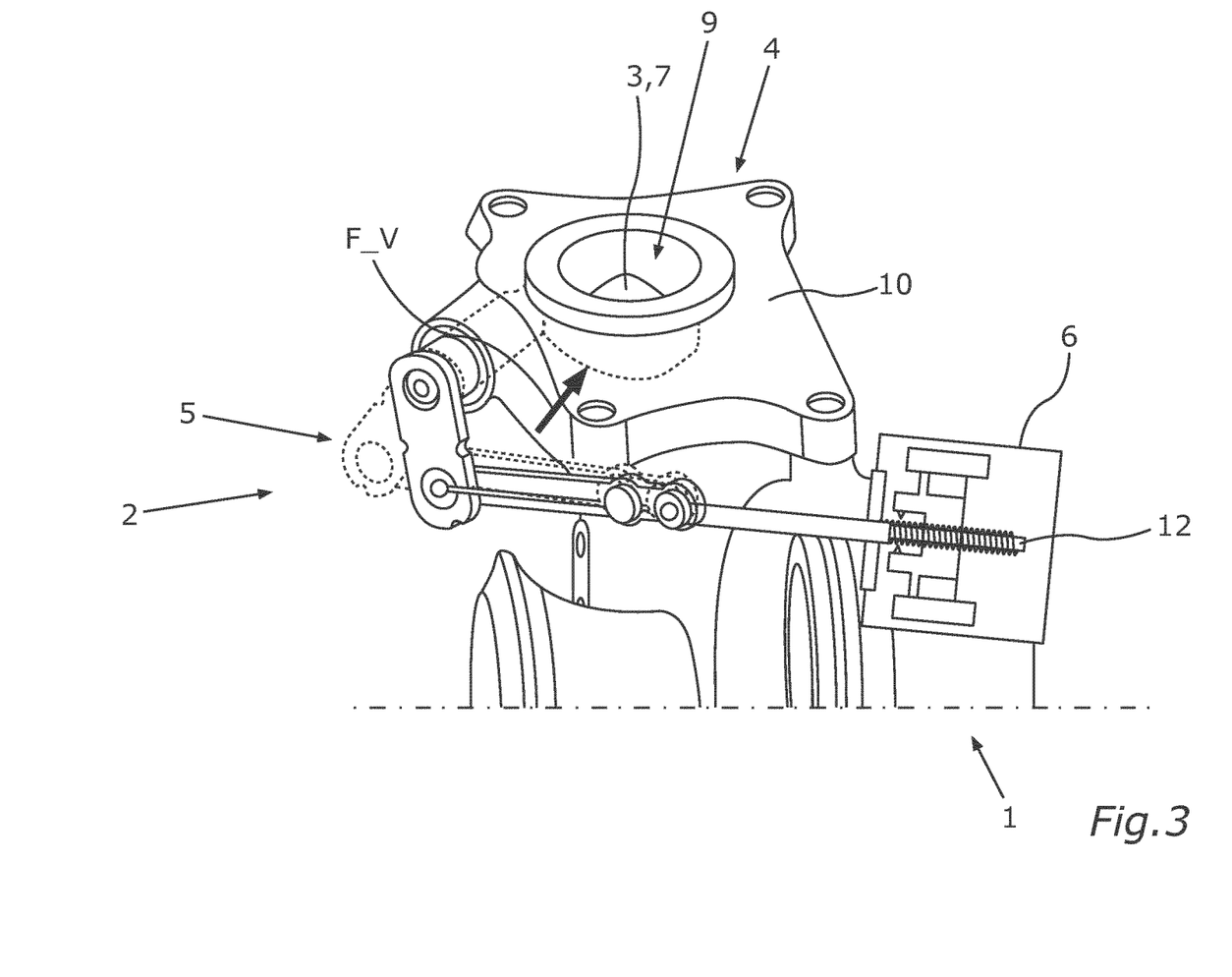
FIG. 3 shows a further side view of the turbine stage.

FIG. 1 shows an exhaust control device 2 for an exhaust turbocharger 1 which, in FIG. 2 and FIG. 3, is illustrated in certain regions. In FIG. 2 and FIG. 3, the exhaust control device 2 is in each case schematically illustrated in its installed position on the exhaust turbocharger 1.

The exhaust control device 2 comprises an exhaust flap 3 for adjusting an exhaust gas flow which flows through a turbine stage 4 of the exhaust turbocharger 1 during operation thereof. The exhaust flap 3 is illustrated in FIG. 2 and in FIG. 3 in a closed position 7 in which the exhaust flap 3 closes an exhaust gas opening 9 in a turbocharger housing 10 of the turbocharger 1, through which opening exhaust gas can flow during operation of the exhaust turbocharger 1.

FIG. 2 additionally shows the exhaust flap 3 schematically and in a dashed-line illustration in a further position 8 which differs from the closed position 7 and in which the exhaust flap 3 allows exhaust gas to flow through the exhaust gas opening 9.

In order to move the exhaust flap 3 between the closed position 7 and the further position 8, the exhaust control device 2 comprises an actuating mechanism 5 which is coupled on the one hand to the exhaust flap 3 and on the other hand to a servomotor 6 of the exhaust control device 2. The exhaust flap 3 can thus be moved between the closed position 7 and the further position 8 in a regulated manner under closed-loop control, and additionally or alternatively in a controlled manner under open-loop control, by means of the servomotor 6 and through the intermediary (with interposition) of the actuating mechanism 5.

The actuating mechanism 5 is designed as a self-locking mechanism by means of which the exhaust flap 3 can be prestressed in its closed position 7 in relation to the turbocharger housing 10. In general, the servomotor 6 can also be designed as self-locking. In its closed position 7, the exhaust flap 3 can be at least intermittently prestressed in relation to the turbocharger housing 10 with the exertion of a prestressing force $F\_V$ in that the servomotor 6 drives the exhaust flap 3 via the actuating mechanism 5. In other words, the exhaust flap 3, in its closed position 7, can be pressed in the region of the exhaust gas opening 9 onto the turbocharger housing 10 with the exertion of the prestressing force $F\_V$ in order as it were to close the exhaust gas opening 9 by means of the exhaust flap 3 and thereby prevent undesired outflow of exhaust gas from the exhaust gas opening 9.

The exhaust control device 2 is generally designed to keep the exhaust flap 3 prestressed in its closed position 7 with the servomotor 6 deactivated. In order to allow this in a particularly simple manner, the actuating mechanism 5 can comprise a worm wheel element 11 and alternatively a threaded spindle element 12. The worm wheel element 11 is indicated in FIG. 2 and the threaded spindle element 12 is indicated in FIG. 3. The worm wheel element 11 comprises a shaft 11A extending from the servomotor 6, a gear 11B attached to the shaft 11A, a threaded spindle 11C attached to the gear 11B, wherein the gear 11B rotates the threaded spindle 11C, and a worm gear 11D, wherein the threaded spindle 11C rotates the worm gear 11D.

During operation of the exhaust turbocharger 1, exhaust gas can flow through the latter on the turbine side of an internal combustion engine (which is not further illustrated here), with the result that accordingly the exhaust gas flow acts on (flows through) the turbine stage 4 of the exhaust turbocharger 1 during operation thereof. Moving the exhaust flap 3 between the closed position 7 and the position 8 allows the exhaust gas flow flowing through the exhaust gas opening 9 to be set and thus the exhaust gas flow to be controlled.

Figure 4:
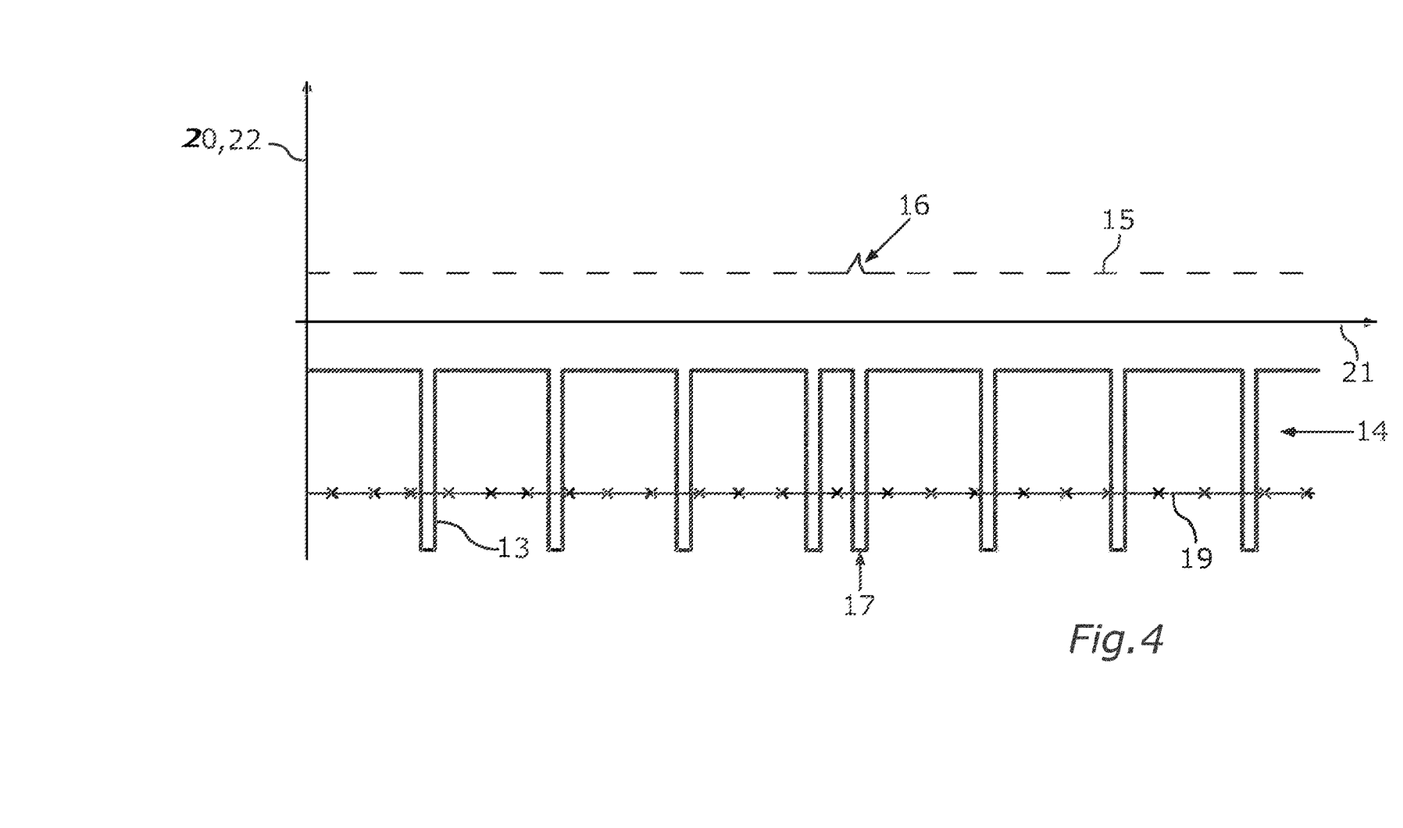
FIG. 4 shows a diagram which shows an activation of a servomotor of the exhaust control device over time, wherein a control of a prestressing force of the exhaust flap occurs by means of a pulsed operation of the servomotor.
Figure 5:
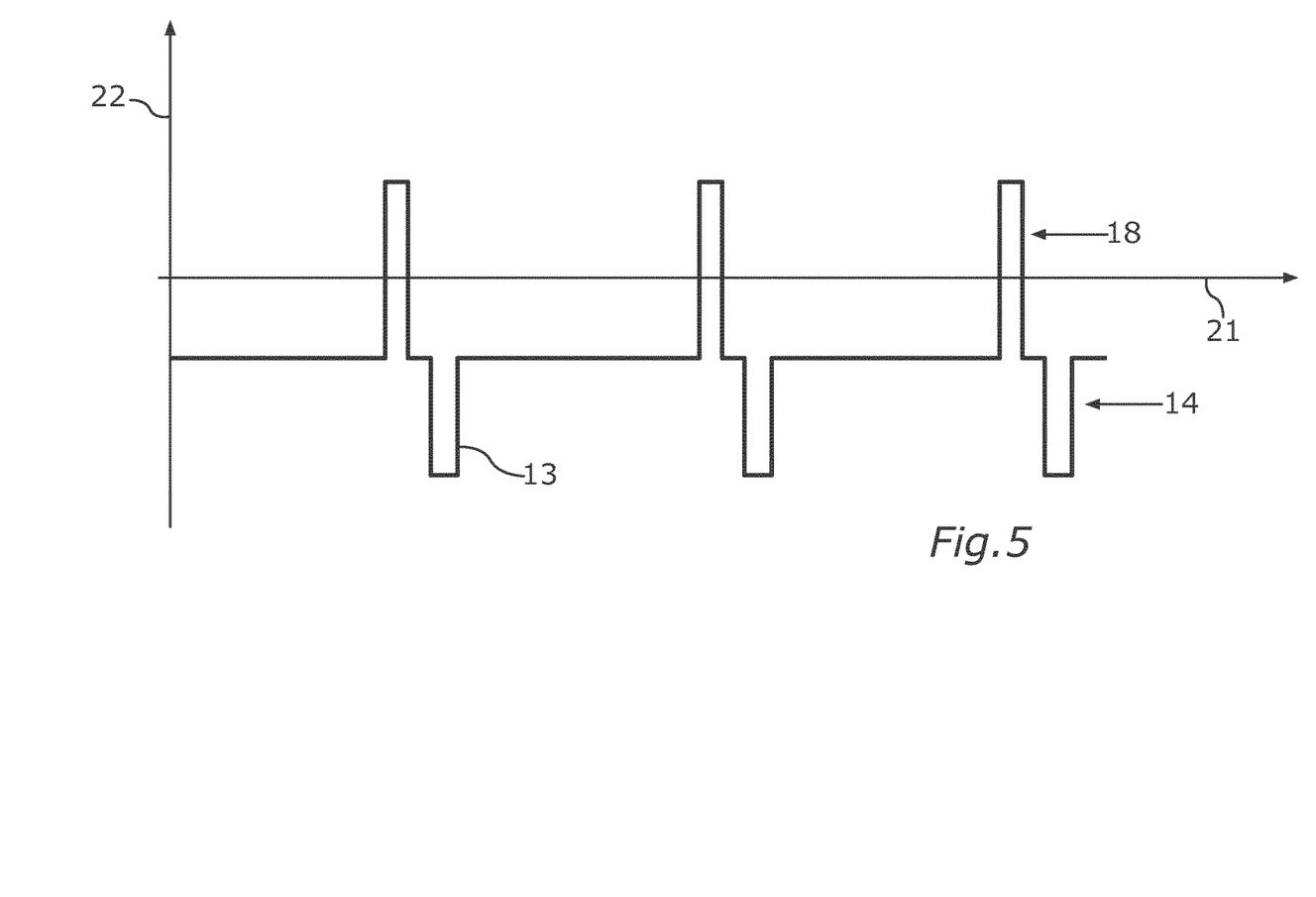
FIG. 5 shows a further diagram which shows a pulsed opening and closing during pulsed operation.

FIG. 4 and FIG. 5 each show diagrams in which an activation 22 of the servomotor 6 is plotted over time 21. Apart from the activation 22 of the servomotor 6, a travel feedback 20 is additionally plotted over time 21 in FIG. 4.

It is evident from FIG. 4 and FIG. 5 that, at least in the closed position 7 of the exhaust flap 3, the servomotor 6 can be operated in a pulsed operation 13.

In the pulsed operation 13, there can occur a pulsed closing 14, that is to say an operation or energization of the servomotor 6 in such a way that, in its closed position 7, the exhaust flap 3 is pressed onto the exhaust gas opening 9 with the exertion of the prestressing force $F\_V$. The prestressing force $F\_V$ under which the exhaust flap 3 is at least intermittently prestressed in relation to the turbocharger housing 10 can thus be set by the pulsed operation 13. The pulsed operation 13 can occur, for example, as a square wave energization of the servomotor 6. In general, a force magnitude of the prestressing force $F\_V$ during the pulsed operation 13 of the servomotor 6 can be reduced if the force magnitude exceeds a predetermined force magnitude limit value.

To better distinguish between the pulsed operation 13 and a conventional operation, FIG. 4 also shows a profile of a conventional activation 19 of the servomotor 6 that is known from the prior art. In the conventional activation 19, there would occur a component-stressing, permanent energization of the servomotor 6 that is dispensed with in the present case during the operation of the exhaust turbocharger 1 or of the exhaust control device 2.

It is evident from the time profile of the pulsed operation 13 shown in FIG. 4 that, for example, the pulsed closing 14 can, on the one hand, occur intermittently, that is to say in cyclical, repeating time increments. On the other hand, the pulsed operation 13 can also occur in an event-based manner as is revealed in FIG. 4 when viewing together a travel feedback profile 15, which relates to the exhaust flap 3, and the profile of the pulsed operation 13. The travel feedback profile 15 shows, as event, a lifting 16 of the exhaust flap 3, that is to say in other words the exhaust flap 3 in its closed position 7 leaving the stop. The lifting 16 characterizes an at least minor movement of the exhaust flap 3 from its closed position 7 in the direction of the further position 8. As soon as the lifting 16 is detected as an event, an extra pulse 17 is applied to the servomotor 6 within the context of an event-controlled intervention in order to counteract an undesired positional change (here: lifting 16) of the exhaust flap 3 and, by virtue of the application of the extra pulse 17 to the servomotor 6 with exertion of the prestressing force F_V, to press the exhaust flap 3 again in the closed position 7 onto the exhaust gas opening 9.

The lifting 16 can occur as a result of an operationally related deformation, for example by a temperature-induced change in length of the turbocharger housing 10. In other words, the operationally related deformation of the turbocharger housing 10 can constitute the event which is responded to by the extra pulse 17 within the scope of the pulsed operation 13.

FIG. 5 shows that, during the pulsed operation 13, there can also occur, in addition to the pulsed closing 14, a pulsed opening 18, that is to say in other words an activation of the servomotor 6 in such a way that the latter moves the exhaust flap 3 at least for a short time from the closed position 7 in the direction of the further position 8 by means of the self-locking actuating mechanism 5. The pulsed opening 18 can also be referred to as relief pulsing. The alternating pulsed opening 18 and pulsed closing 14 shown in FIG. 5 within the context of the pulsed operation 13 can reduce or increase the force magnitude of the prestressing force F_V during the pulsed operation 13 of the servomotor 6, with the result that it is at least largely possible to prevent a predetermined force magnitude limit value from being exceeded. The pulsed opening 18 allows the prestressing and hence the force magnitude of the prestressing force F_V to be reduced first of all, and the subsequent, pulsed closing 14 allows the desired prestressing (desired force magnitude of the prestressing force F_V) in the stop of the exhaust flap 3, that is to say in the closed position 7 of the exhaust flap 3, to be ensured. The relief pulsing can also occur intermittently, that is to say in cyclical, repeating time increments.

LIST OF REFERENCE CHARACTERS

1 Exhaust turbocharger
2 Exhaust control device
3 Exhaust flap
4 Turbine stage
5 Actuating mechanism
6 Servomotor
7 Closed position
8 Position
9 Exhaust gas opening
10 Turbocharger housing
11 Worm wheel element
11A Shaft
11B Gear
11C Threaded spindle
11D Worm gear
12 Threaded spindle element
13 Pulsed operation
14 Pulsed closing
15 Travel feedback profile
16 Lifting (of the exhaust flap; leaving the stop)
17 Extra pulse (event-controlled pulsed operation)
18 Pulsed opening
19 Conventional activation
20 Travel feedback
21 Time
22 Activation
F_V Prestressing force The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust turbocharger, comprising:
   an exhaust control device, wherein the exhaust control device includes:
   an exhaust flap for adjusting an exhaust gas flow which flows through a turbine stage of the exhaust turbocharger during operation thereof;
   an actuating mechanism coupled to the exhaust flap; and
   a servomotor via which the exhaust flap is movable in a regulated and/or a controlled manner, through the intermediary of the actuating mechanism, between a closed position in which the exhaust flap closes an exhaust gas opening in a turbocharger housing of the turbocharger, through which exhaust gas opening exhaust gas is flowable during operation of the exhaust turbocharger, and a further position in which the exhaust flap allows exhaust gas to flow through the exhaust gas opening;
   wherein the actuating mechanism is a self-locking mechanism via which the exhaust flap can be prestressed in the closed position in relation to the turbocharger housing;
   wherein the actuating mechanism comprises a shaft extending from the servomotor, a gear attached to the shaft, a threaded spindle attached to the gear, wherein the gear rotates the threaded spindle, and a worm gear, wherein the threaded spindle rotates the worm gear, and wherein the actuating mechanism is coupled to the servomotor at a first end and is coupled to the exhaust flap at a second end.

2. The exhaust turbocharger according to claim 1, wherein the exhaust control device is configured to keep the exhaust flap prestressed in the closed position with the servomotor deactivated.

3. An exhaust control device for an exhaust turbocharger, comprising:

an exhaust flap for adjusting an exhaust gas flow which flows through a turbine stage of the exhaust turbocharger during operation thereof;

an actuating mechanism coupled to the exhaust flap; and a servomotor via which the exhaust flap is movable in a regulated and/or a controlled manner, through the intermediary of the actuating mechanism, between a closed position in which the exhaust flap closes an exhaust gas opening in a turbocharger housing of the turbocharger, through which exhaust gas opening exhaust gas is flowable during operation of the exhaust turbocharger, and a further position in which the exhaust flap allows exhaust gas to flow through the exhaust gas opening;

wherein the actuating mechanism is a self-locking mechanism via which the exhaust flap can be prestressed in the closed position in relation to the turbocharger housing;

wherein the actuating mechanism comprises a shaft extending from the servomotor, a gear attached to the shaft, a threaded spindle attached to the gear, wherein the gear rotates the threaded spindle, and a worm gear, wherein the threaded spindle rotates the worm gear, and wherein the actuating mechanism is coupled to the servomotor at a first end and is coupled to the exhaust flap at a second end.

4. A method for operating the exhaust turbocharger according to claim 1, comprising the acts of:

flowing an exhaust gas flow through the turbine stage of the exhaust turbocharger; and regulating and/or controlling the exhaust gas flow flowing through the turbine stage by moving the exhaust flap at least between the closed position and the further position;

wherein the servomotor is operated in a pulsed operation, wherein in the pulsed operation the exhaust flap is operated by the servomotor with a pulsed opening of the exhaust flap and a subsequent pulsed closing of the exhaust flap.

5. The method according to claim 4, wherein a force magnitude of a prestressing force on the exhaust flap is reduced during the pulsed opening and wherein a desired force magnitude of the prestressing force on the exhaust flap is ensured by the subsequent pulsed closing.

* * * * *